(12) United States Patent
Tanaka

(10) Patent No.: US 7,093,944 B2
(45) Date of Patent: Aug. 22, 2006

(54) LIGHT SHIELDING STRUCTURE OF A LENS BARREL

(75) Inventor: Hitoshi Tanaka, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/675,993

(22) Filed: Oct. 2, 2003

(65) Prior Publication Data

US 2004/0070849 A1  Apr. 15, 2004

(30) Foreign Application Priority Data

Oct. 9, 2002  (JP) .............................. 2002-295918

(51) Int. Cl.
   *G02B 23/16*  (2006.01)
(52) U.S. Cl. ........................ 359/611; 359/601; 359/612
(58) Field of Classification Search ................ 359/611, 359/601, 612, 609
   See application file for complete search history.

(56) References Cited

U.S. PATENT DOCUMENTS 6,437,924 B1 *  8/2002  Azegami ..................... 359/694

FOREIGN PATENT DOCUMENTS

JP  2001-215381  8/2001

* cited by examiner

*Primary Examiner*—Drew A. Dunn
*Assistant Examiner*—Joshua L. Pritchett
(74) *Attorney, Agent, or Firm*—Greenblum & Bernstein, P.L.C.

(57) ABSTRACT

A light shielding structure of a lens barrel including an inner ring and an outer ring, wherein the inner ring includes a through cutout portion, the light shielding structure including an inner flange wall provided with the inner ring; a first annular groove formed on an inner surface of the inner flange wall; a second annular groove formed on an inner peripheral surface of the outer ring; and a light shield ring, wherein the light shield ring includes a cylindrical portion centered about the optical axis, and an outer flange portion which extends radially outwards from a rear end of the cylindrical portion so that the cylindrical portion and the outer flange portion and inserted into the first and second annular grooves, respectively.

20 Claims, 3 Drawing Sheets

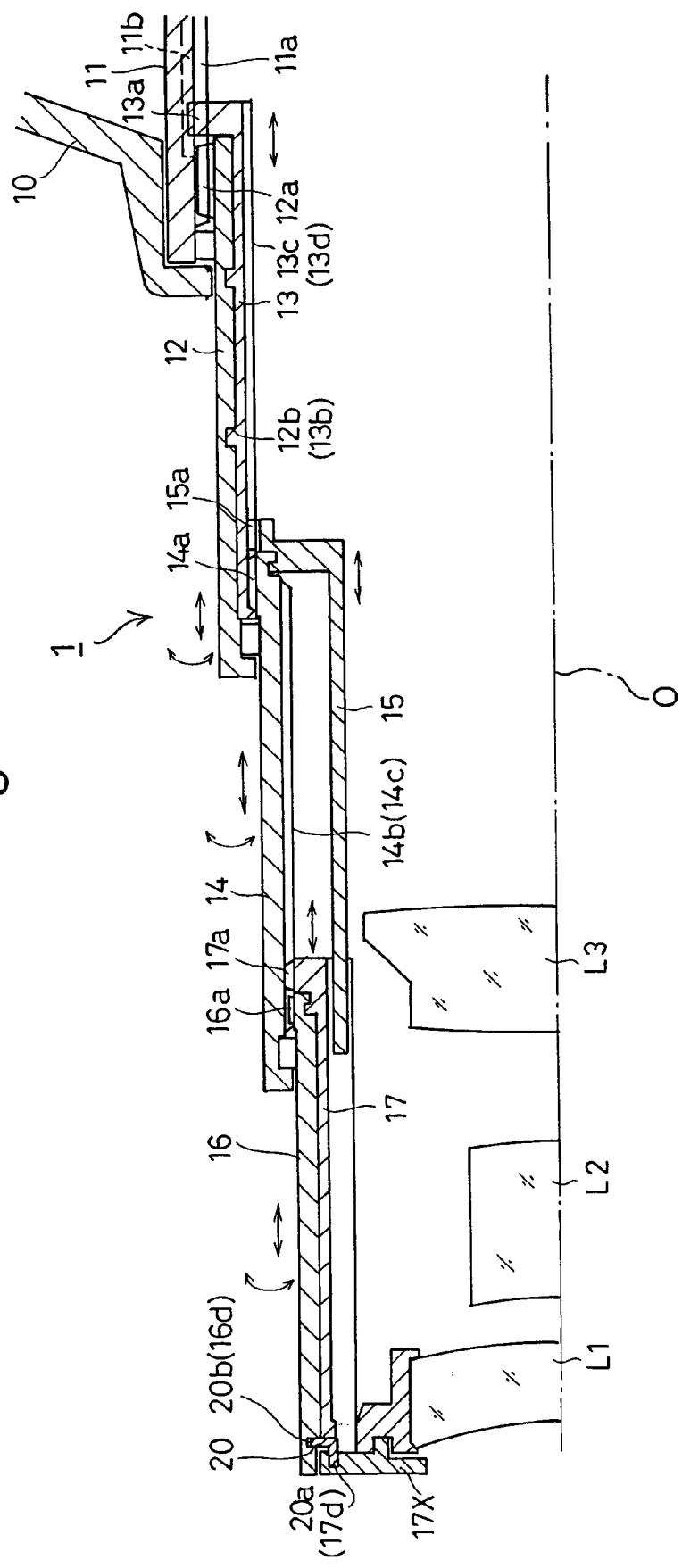

LIGHT SHIELDING STRUCTURE OF A LENS BARREL

BACKGROUND OF THE INVENTION

1. Field of the Invention

The present invention relates to a light shielding structure of a lens barrel including an inner ring and an outer ring, at least one of which rotates relative to the other, and the inner ring has at least one through cutout portion which radially extends through the inner ring to allow the entry of harmful light.

2. Description of the Related Art

Lens barrels used for optical devices such as cameras are often provided with an inner ring and an outer ring, at least one of which being rotatable relative to the other. In such conventional lens barrels, it is often the case that a light shielding structure such as a labyrinth structure is formed on the inner ring and the outer ring therebetween in the vicinity of their respective front ends. However, if such a labyrinth structure is formed between the inner ring and the outer ring, at least one of which being rotatable relative to the other, it is necessary to provide a large clearance between the inner ring and the outer ring in order to accommodate eccentricity of the inner ring or the outer ring relative to the other. This increases the diameter of the lens barrel or the resistance to relative rotation between the inner ring and the outer ring.

SUMMARY OF THE INVENTION

The present invention provides a light shielding structure of a lens barrel including an inner ring and an outer ring positioned outside the inner ring, wherein at least one of the inner ring and the outer ring rotates relative to the other, wherein the inner ring has at least one through cutout portion which radially extends through the inner ring allowing light to pass therethrough, and wherein the light shielding structure eliminates the need for accommodating eccentricity in the inner ring or the outer ring relative to the other, and provides a minimum resistance to relative rotation between the inner ring and the outer ring.

According to an aspect of the present invention, a light shielding structure of a lens barrel is provided, including an inner ring and an outer ring positioned outside the inner ring so that at least one of the inner ring and the outer ring rotates relative to the other, wherein the inner ring includes at least one through cutout portion which radially extends through the inner ring, the light shielding structure including an inner flange wall provided with the inner ring to be positioned in front of the through cutout portion in an optical axis direction; a first annular groove formed on an inner surface of the inner flange wall, the first annular groove being centered about the optical axis; a second annular groove formed on an inner peripheral surface of the outer ring; and a light shield ring having a substantially L-shaped cross section, wherein the light shield ring includes a cylindrical portion centered about the optical axis, and an outer flange portion which extends radially outwards from a rear end of the cylindrical portion so that the cylindrical portion is inserted into the first annular groove to be slidably movable relative thereto, and so that the outer flange portion is inserted into the second annular groove to be slidably movable relative thereto.

It is desirable for the inner flange wall to be formed as a separate member from the inner ring, the inner flange wall being provided on a front end surface of the inner ring.

The light shield ring can be made of synthetic resin which has a resiliency such that the cylindrical portion and the outer flange portion can be inserted into the first annular groove and the radial annular groove, respectively.

The inner flange wall can serve as a decorative member which forms a portion of the front end appearance of the lens barrel.

It is desirable for the outer ring to be movable in the optical axis direction while rotating relative to the inner ring, and for the inner ring to be movable in the optical axis direction without rotating relative to a stationary barrel of the lens barrel.

The lens barrel can be incorporated in a camera to serve as a photographing lens barrel.

The lens barrel can be a retractable lens barrel which can be retracted into a camera body when not in use.

The present disclosure relates to subject matter contained in Japanese Patent Application No.2002-295918 (filed on Oct. 9, 2002), which is expressly incorporated herein by reference in its entirety.

BRIEF DESCRIPTION OF THE DRAWINGS

The present invention will be described below in detail with reference to the accompanying drawings in which:

FIG. 2 is a view similar to that of FIG. 1 and shows the fundamental elements of the lens barrel shown in FIG. 1 in a fully extended state;

DESCRIPTION OF THE PREFERRED EMBODIMENT

Figure 1:
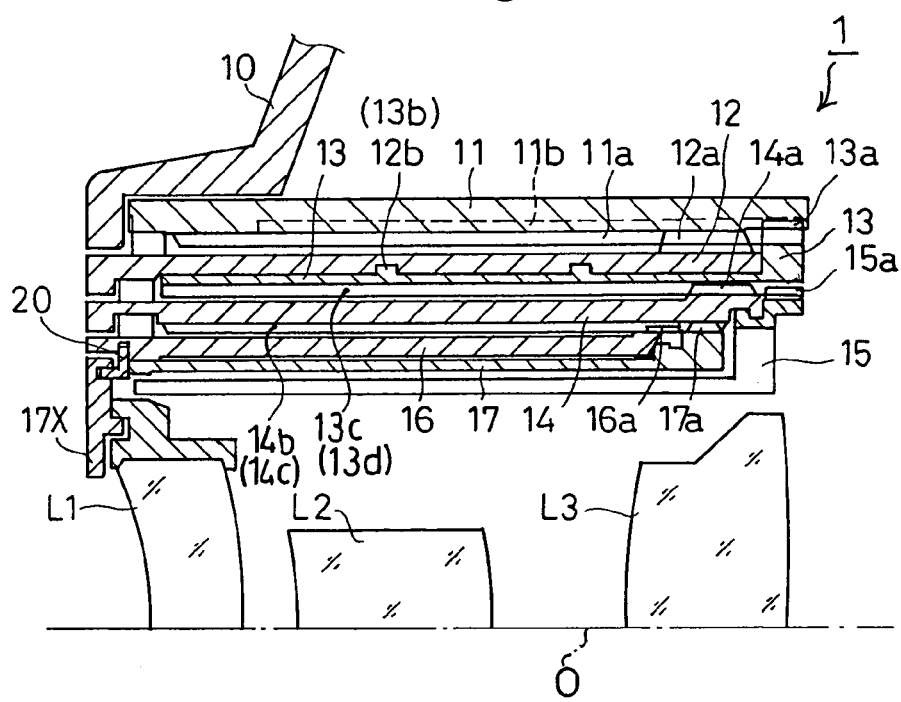
FIG. 1 is an axial cross sectional view of fundamental elements of an embodiment of a lens barrel having a light shielding structure according to the present invention, showing only an upper half of the lens barrel from the optical axis thereof in a fully retracted state.

FIGS. 1 and 2 show an embodiment of a lens barrel having a light shielding structure according to the present invention. The lens barrel 1 is incorporated in a camera having an exterior cover 10. The lens barrel 1 is a retractable lens barrel which is fully retracted when not in use as shown in FIG. 1. The camera can be a lens-shutter camera using photosensitive film or a digital camera using an image pick-up device. The lens barrel 1 is provided with a stationary ring 11 which is positioned inside the exterior cover 10 and is fixed thereto. The stationary ring 11 is provided on an inner peripheral surface thereof with a female helicoid 11a and a set of three linear guide grooves 11b (only one of them appears in FIGS. 1 and 2) extending parallel to an optical axis O. The lens barrel 1 is provided inside the stationary ring 11 with a helicoid ring 12. The helicoid ring 12 is provided on an outer peripheral surface thereof with a male helicoid 12a which is engaged with the female helicoid 11a of the stationary ring 11. The lens barrel 1 is provided inside the helicoid ring 12 with a first linear guide ring 13. The first linear guide ring 13 is provided at a rear end thereof with a set of three linear guide projections 13a (only one of them appears in FIGS. 1 and 2) which are engaged in the set of three linear guide grooves 11b of the stationary ring 11, respectively. The helicoid ring 12 is provided on an inner peripheral surface thereof with a circumferential groove 12b which extends in a circumferential direction of the helicoid ring 12 while the first linear guide ring 13 is provided on an outer peripheral surface thereof with projections 13b (only one of them appears in FIGS. 1 and 2) which are engaged in the circumferential groove 12b. Namely, the helicoid ring 12 and the first linear guide ring 13 are coupled to each other by engagement of the set of three projections 13b with the circumferential groove 12b being movable together therewith along the optical axis O while allowing the helicoid ring 12 to rotate freely relative to the first linear guide ring 13. Accordingly, rotating the helicoid ring 12 causes the helicoid ring 12 to move along the optical axis O while rotating relative to the first linear guide ring 13, and at the same time, causes the first linear guide ring 13 to move together with the helicoid ring 12 along the optical axis O without rotating.

The first linear guide ring 13 is provided on an inner peripheral surface thereof with a female helicoid 13c, and a set of three linear guide grooves 13d (only one of them appears in FIGS. 1 and 2) extending parallel to an optical axis O. The lens barrel 1 is provided inside the first linear guide ring 13 with a cam ring 14. The cam ring 14 is provided, on an outer peripheral surface thereof in the vicinity of the rear end of the cam ring 14, with a male helicoid 14a which is engaged with the female helicoid 13c. The helicoid ring 12 and the cam ring 14 are coupled to each other to be freely movable relative to each other along the optical axis O. In addition, the helicoid ring 12 and the cam ring 14 are coupled to each other so that only rotation of the helicoid ring 12 is transferred to the cam ring 14 via a rotation transfer mechanism (not shown). The lens barrel 1 is provided inside the cam ring 14 with a second linear guide ring 15. The second linear guide ring 15 is provided at a rear end thereof with a set of three linear guide projections 15a (only one of them appears in FIGS. 1 and 2) which are engaged in the set of three linear guide grooves 13d of the first linear guide ring 13, respectively. The cam ring 14 and the second linear guide ring 15 are coupled to each other to be movable together along the optical axis O while allowing the cam ring 14 to rotate freely relative to the second linear guide ring 15.

The cam ring 14 is provided on an inner peripheral surface thereof with a female helicoid 14b and a set of three rotation transfer grooves 14c (only one of them appears in FIGS. 1 and 2) extending parallel to the optical axis O. The lens barrel 1 is provided inside the cam ring 14 with a drive ring (outer ring) 16. The drive ring 16 is provided at a rear end thereof with a set of three rotation transfer projections 16a (only one of them appears in FIGS. 1 and 2) which are engaged in the set of three rotation transfer grooves 14c, respectively. The lens barrel 1 is provided inside the drive ring 16 with a first lens group moving ring (inner ring) 17. The first lens group moving ring 17 is provided, on an outer peripheral surface thereof in the vicinity of a rear end of the first lens group moving ring 17, with a male helicoid 17a which is engaged with the female helicoid 14b of the cam ring 14. The drive ring 16 and the first lens group moving ring 17 are coupled to each other to be movable together along the optical axis O while allowing the drive ring 16 to rotate freely relative to the first lens group moving ring 17. The first lens group moving ring 17 is guided linearly along the optical axis O without rotating by the second linear guide ring 15.

In the above described lens barrel 1, upon a rotation of the helicoid ring 12 being transferred to the cam ring 14, the cam ring 14 moves along the optical axis O while rotating due to the engagement of the linear guide projections 13a with the linear guide grooves 11b and the engagement of the male helicoid 14a with the female helicoid 13c. This rotation of the cam ring 14 is transferred to the drive ring 16 via the engagement of the rotation transfer grooves 14c with the rotation transfer projections 16a. At the same time, the first lens group moving ring 17, which moves together with drive ring 16 along the optical axis O, moves linearly along the optical axis O without rotating since the first lens group moving ring 17 is guided linearly along the optical axis O without rotating via the second linear guide ring 15 and since the first lens group moving ring 17 is coupled to the cam ring 14 via the engagement of the male helicoid 17a with the female helicoid 14b. The lens barrel 1 is provided therein with a photographing optical system including three lens groups: a first lens group L1, a second lens group L2 and a third lens group L3, in this order from the object side (the left side as viewed in FIGS. 1 and 2). The first lens group L1 is supported by the first lens group moving ring 17, and the second lens group L2 and the third lens group L3 move along the optical axis O in accordance with the rotation and the axial movement of the first lens group moving ring 17 via a cam mechanism (not shown) which includes cam grooves formed on an inner peripheral surface of the cam ring 14.

Figure 3:
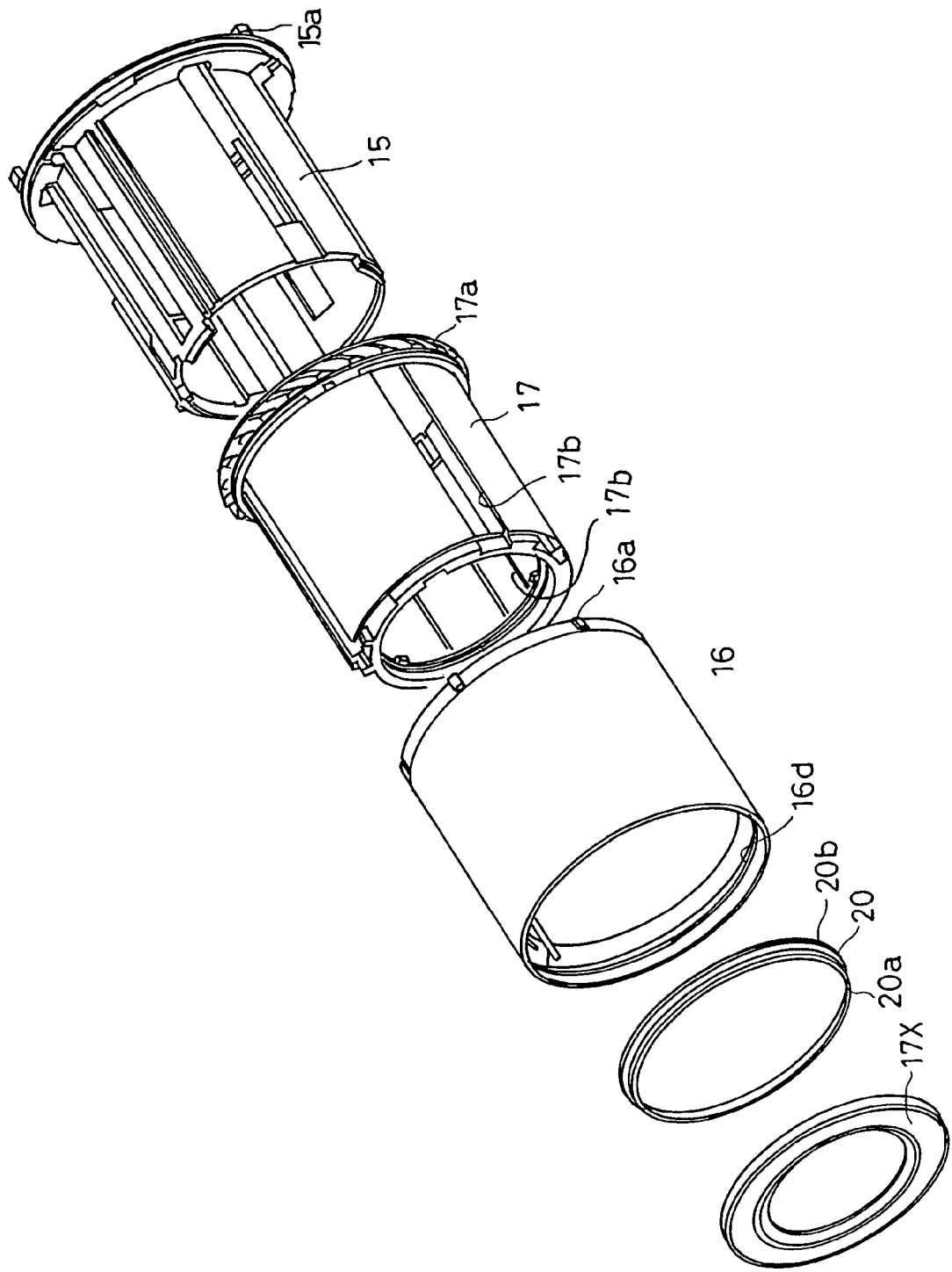
FIG. 3 is an exploded perspective view of fundamental elements of the lens barrel shown in FIGS. 1 and 2 which are associated with the light shielding structure according to the present invention.

The lens barrel 1 is provided with a light shielding structure for preventing light which enters through a gap between the first lens group moving ring (outer ring) 17 and the drive ring (inner ring which is rotatable relative the first lens group moving ring 17) 16 from entering the inside of the lens barrel 1 as harmful light (the light which is incident on an image plane without passing through the photographing optical system (L1, L2 and L3)). As shown in FIG. 3, the first lens group moving ring 17 is provided with a plurality of clearance slits (cut out portions) 17b (only two of them appear in FIG. 3) which serve as through holes which radially extend through the first lens group moving ring 17. The clearance slits 17b present a problem of allowing harmful light which may enter inside the lens barrel 1 from a gap between the drive ring 16 and the first lens group moving ring 17.

Figure 4:
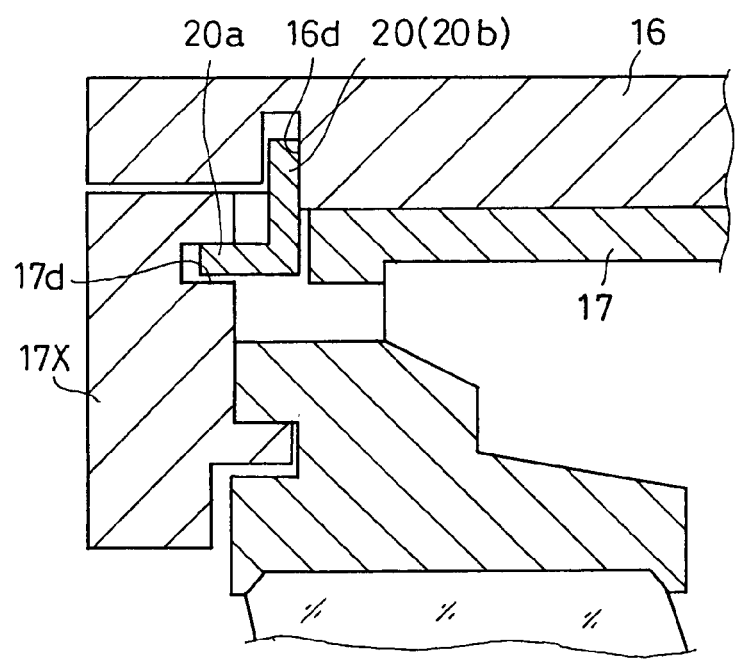
FIG. 4 is an enlarged cross sectional view of a fundamental portion of the light shielding structure of the lens barrel shown in FIGS. 1 and 2.

The lens barrel 1 is provided at a front end thereof with a front end decorative plate (inner flange wall) 17X which constitutes a portion of the front end appearance of the lens barrel 1. The front end decorative plate 17X is fixed to a front end surface of the first lens group moving ring 17 by adhesive to serve as an inner flange wall. As shown in FIG. 4, the front end decorative plate 17X is provided on an inner surface thereof facing the first lens group moving ring 17 with an annular groove 17d having the center thereof on the optical axis O. The drive ring 16 is provided on an inner peripheral surface thereof with a radial annular groove 16d which is recessed radially outwards and positioned on a plane perpendicular to the optical axis O. The lens barrel 1 is provided therein in the vicinity of the front end thereof with a light shield ring 20 which is engaged with both the radial annular groove 16d and the annular groove 17d and extends between the inside of the radial annular groove 16d and the inside of the annular groove 17d. Specifically, the light shield ring 20 has a substantially L-shaped cross section, and is provided with a cylindrical portion 20a, the center of which is coincident with the optical axis O, and an outer flange portion 20b which extends radially outwards from the rear end of the cylindrical portion 20a so that the cylindrical portion 20a is inserted into the annular groove 17d to be freely movable thereto and so that the outer flange portion 20b is inserted into the radial annular groove 16d to be freely movable thereto. The light shield ring 20 is made of opaque (non light transmittable) synthetic resin which has a resiliency such that the cylindrical portion 20a and the outer flange portion 20b can be inserted into the annular groove 17d and the radial annular groove 16d, respectively.

According to the above described light shielding structure which uses the light shield ring 20, entry of harmful light into a gap between the drive ring 16 and the first lens group moving ring 17 from the front end of the gap can be reliably prevented by the light shield ring 20. Note that the amount of clearance between the drive ring 16 and the first lens group moving ring 17 does not have to be great because the cylindrical portion 20a and the outer flange portion 20b are movably engaged in the annular groove 17d and the radial annular groove 16d, respectively. Namely, eccentricity of the radial annular groove 16d is absorbed by a movement of the cylindrical portion 20a relative to the annular groove 17d even if the radial annular groove 16d is eccentric to the annular groove 17d. On the other hand, eccentricity of the annular groove 17d is absorbed by a movement of the outer flange portion 20b relative to the radial annular groove 16d even if the annular groove 17d is eccentric to the radial annular groove 16d. Accordingly, entry of harmful light can be prevented from entering through a gap between the drive ring 16 and the first lens group moving ring 17 from the front end thereof via the light shield ring 20 with a minimum clearance between the drive ring 16 and the first lens group moving ring 17. In addition, the light shielding structure does not increase the resistance to relative rotation between the drive ring 16 and the first lens group moving ring 17 since the cylindrical portion 20a and the outer flange portion 20b of the light shield ring 20 are slidably engaged in the radial annular groove 16d and the annular groove 17d, respectively. Resistance to relative rotation between the drive ring 16 and the first lens group moving ring 17 does not vary depending upon the rotational position of the drive ring 16 with respect to the first lens group moving ring 17.

Although formed as separate members in the above illustrated embodiment of the lens barrel, the first lens group moving ring 17 and the front end decorative plate 17X can be formed as an integral member.

The drive ring 16 and the first lens group moving ring 17 represent examples of an outer ring and an inner ring, at least one of which rotates relative to the other, in the above illustrated embodiment of the lens barrel. The present invention can be applied not only to the light shielding structure of such a particular embodiment using the drive ring 16 and the first lens group moving ring 17, but also to a light shielding structure of any other lens barrel including an outer ring and an inner ring, at least one of which rotates relative to the other regardless of the overall structure of the lens barrel.

As can be understood from the foregoing, according to the present invention, a light shielding structure of a lens barrel including an inner ring and an outer ring positioned outside the inner ring can be achieved, wherein at least one of the inner ring and the outer ring rotates relative to the other, the inner ring has at least one through cutout portion which radially extends through the inner ring to allow the entry of harmful light, the light shielding structure eliminates the need for taking eccentricity of one of the inner ring and the outer ring relative to the other into consideration, and provides a minimum resistance to relative rotation between the inner ring and the outer ring.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A light shielding structure of a lens barrel including an inner ring and an outer ring positioned outside said inner ring so that at least one of said inner ring and said outer ring rotates relative to the other, said inner ring and said outer ring being configured to move along an optical axis of the lens barrel without relative axial movement therebetween, wherein said inner ring includes at least one cutout portion which radially extends through said inner ring, said light shielding structure comprising:
   an inner flange wall provided with said inner ring and positioned at a front end surface of said inner ring;
   a first annular groove provided on a rear facing surface of said inner flange wall, said first annular groove being centered about the optical axis;
   a second annular groove provided on an inner peripheral surface of said outer ring; and
   a light shield ring which includes a cylindrical portion centered about said optical axis, and an outer flange portion which extends radially outwards from a rear end of said cylindrical portion so that said cylindrical portion extends into said first annular groove to be slidably movable relative thereto, and so that said outer flange portion extends into said second annular groove to be slidably movable relative thereto.

2. The light shielding structure according to claim 1, wherein said inner flange wall comprises a member separate from the inner ring.

3. The light shielding structure according to claim 1, wherein said light shield ring is made of synthetic resin which has a resiliency such that said cylindrical portion and said outer flange portion can be inserted into said first annular groove and said second annular groove, respectively.

4. The light shielding structure according to claim 1, wherein said inner flange wall serves as a decorative member which forms a portion of a visible front end of said lens barrel.

5. The light shielding structure according to claim 1, wherein said outer ring is movable in said optical axis direction while rotating relative to said inner ring, and wherein said inner ring is movable in said optical axis direction without rotating relative to a stationary barrel of said lens barrel.

6. The light shielding structure according to claim 1, wherein said lens barrel is incorporated in a camera to serve as a photographing lens barrel.

7. The light shielding structure according to claim 6, wherein said lens barrel comprises a retractable lens barrel which can be retracted into a camera body when not in use.

8. A light shielding structure according to claim 1, said light shield ring having a generally L-shaped cross-section.

9. The light shielding structure according to claim 1, said inner flange wall being fixedly mounted to said inner ring.

10. The light shielding structure according to claim 1, said first annular groove extending into the rear facing surface of said inner flange wall in a first direction, said second annular groove extending into the inner peripheral surface of said outer ring in a second direction, said first direction and said second direction being transverse to each other.

11. The light shielding structure according to claim 1, said outer flange portion of said light shielding ring comprising a complete circular flange.

12. A light shielding structure of a lens barrel, the lens barrel including an inner ring and an outer ring positioned externally of said inner ring, said inner ring and said outer ring being mounted for relative rotation with respect of each other, said inner ring and said outer ring being configured to move alone an optical axis of the lens barrel without relative axial motion therebetween, said light shielding structure comprising:

an inner flange wall mounted to a front end surface of said inner ring and movable together with said inner ring;

a first annular groove provided on rear facing surface of said inner flange wall;

a second annular groove provided on an inner peripheral surface of said outer ring, and a light shield ring, said light shield ring comprising a cylindrical portion and an outer flange portion which extends radially outwardly from a rear end of said cylindrical portion, said light shield ring being configured so that said cylindrical portion extends into said first annular groove and is slidably movable relative to said first annular groove, and said outer flange portion extends into said second annular groove and is slidably movable relative to said second annular groove.

13. The light shielding structure according to claim 12, said inner flange wall comprising a member distinct from said inner ring.

14. The light shielding structure according to claim 12, wherein said light shield ring comprises a synthetic resin material having a resiliency such that said cylindrical portion and said outer flange portion are insertable into said first annular groove and said second annular groove.

15. The light shielding structure according to claim 12, said inner flange wall comprises a decorative member which comprises an external portion of a front end of said lens barrel.

16. The light shielding structure according to claim 12, wherein said outer ring is movable in an optical axial direction while rotating relative to said inner ring, and said inner ring is movable in the optical axis direction without rotation relative to a stationary barrel of said lens barrel.

17. The light shielding structure according to claim 12, said lens barrel comprising a photographing lens barrel of a camera.

18. The light shielding structure according to claim 17, said lens barrel comprising a retractable lens barrel configured for retraction into a camera body.

19. The light shielding structure according to claim 12, said first annular groove extending into the inner surface of said inner flange wall in a first direction, said second annular groove extending into the inner peripheral surface of said outer ring in a second direction, said first direction and said second direction being transverse to each other.

20. The light shielding structure according to claim 12, said outer flange portion of said light shielding ring comprising a complete circular flange.

* * * * *